(12) United States Patent
McCloskey

(10) Patent No.: US 12,041,870 B2
(45) Date of Patent: Jul. 23, 2024

(54) PRESS WHEEL ASSEMBLY FOR DELICATE SEED PLANTING AND DATA ACQUISITION FOR A SEED PLANTER

(71) Applicant: Robert Craig McCloskey, North Wiltshire (CA)

(72) Inventor: Robert Craig McCloskey, North Wiltshire (CA)

( * ) Notice: Subject to any disclaimer, the term of this patent is extended or adjusted under 35 U.S.C. 154(b) by 939 days.

(21) Appl. No.: 16/974,070

(22) Filed: Sep. 21, 2020

(65) Prior Publication Data
US 2021/0007273 A1    Jan. 14, 2021

Related U.S. Application Data

(63) Continuation-in-part of application No. 15/932,195, filed on Feb. 16, 2018, now abandoned.

(51) Int. Cl.
| | |
|---|---|
| *A01C 7/08* | (2006.01) |
| *A01B 29/00* | (2006.01) |
| *A01B 39/08* | (2006.01) |
| *A01C 5/06* | (2006.01) |

(52) U.S. Cl.
CPC ............... *A01C 7/08* (2013.01); *A01B 29/00* (2013.01); *A01B 39/08* (2013.01); *A01C 5/068* (2013.01); *G05B 2219/37399* (2013.01)

(58) Field of Classification Search
CPC ......... A01B 29/00; A01B 39/08; A01B 79/02; A01C 5/068; G05B 19/4155; G05B 2219/37399; B60C 5/00; B60C 2200/08
See application file for complete search history.

(56) References Cited

U.S. PATENT DOCUMENTS

| | | | | |
|---|---|---|---|---|
| 3,181,622 A | * | 5/1965 | Adams | ..................... B60B 3/08 172/519 |
| 4,273,057 A | * | 6/1981 | Pollard | ..................... A01C 5/06 111/164 |
| 4,489,790 A | * | 12/1984 | Lattin | .................. A01B 29/043 172/519 |
| 9,588,019 B2 | * | 3/2017 | Brushaber | ............. B60C 23/066 |
| 2017/0105333 A1 | * | 4/2017 | Glenn | ............... B60C 23/00336 |
| 2022/0371555 A1 | * | 11/2022 | Schaffert | ................ A01C 5/068 |

* cited by examiner

*Primary Examiner* — Jessica H Lutz
(74) *Attorney, Agent, or Firm* — Mario Theriault

(57) ABSTRACT

The press wheel has instrumentation associated therewith detecting a rolling of the wheel over a planted set. A computing device is connected to the instrumentation and to the speed monitoring device of the planter. The computing device determines spacings between planted sets. The data obtained is real-time data and is readily available to the operator of the planter so that the speed of the planter can be adjusted on the fly to maintain an ideal set spacing. The press wheel has a soft, smooth, flexible and stretchable rolling surface capable of deforming over a planted set and detecting an imprint of the planted set in the surface thereof, without damaging the planted set. A contact signature of the rolling of the press wheel over a planted set shows that the "rolling on" of the press wheel over a planted set is as smooth as the "rolling away" from the planted set.

1 Claim, 14 Drawing Sheets

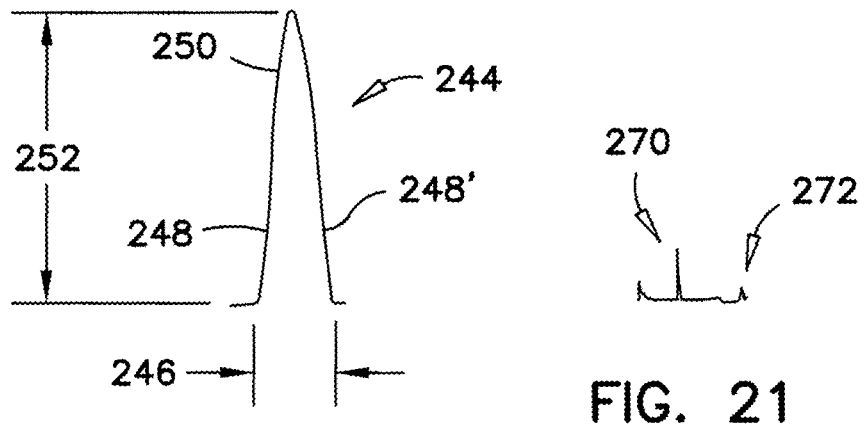
FIG. 20
FIG. 21
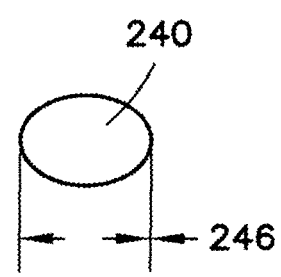
FIG. 22

PRESS WHEEL ASSEMBLY FOR DELICATE SEED PLANTING AND DATA ACQUISITION FOR A SEED PLANTER

The present application is a Continuation-In-Part of U.S. Non-Provisional application Ser. No. 15/932,195, filed Feb. 16, 2018.

FIELD OF THE INVENTION

This invention pertains to careful planting of seeds, recording seed placement in a furrow, and more particularly it pertains to recording real time performance of a seed planter.

BACKGROUND OF THE INVENTION

The yield of many crops depends on the exact placement of each seed or set in a furrow. The yield depends on the placement of seeds relative to each other and relative to the geometry of the furrow. For illustration purposes, the examples provided herein refer to potato planting. The problems encountered with potato planting are also found in the planting of other seeds or sets having substantial mass, such as beans and corn. Therefore, the examples given herein do not restrict the present invention to the planting of potato seed pieces. The examples given herein using potato seed pieces are presented herein for convenience to facilitate the understanding of planting problems with other seeds and sets capable of accumulating momentum.

Potato seed pieces are known in the agricultural language as potato sets. A "set" represents any small tuber or part of a tuber, an onion, a corn seed, etc. For convenience, the word "set" is used interchangeably herein with seed and seed pieces, for designating any plant precursor that is planted in the ground for the purpose of producing crops.

Ideal market-size potatoes are the size of a baseball for example and have not been exposed to sunburn along the side of a furrow. The planting of potato sets to obtain an ideal market-size shape must be done at the center of the furrow, and each plant must benefits of sufficient growing space to avoid tuber crowding in the furrow.

Set spacing is also critical to achieve an ideal yield per acre from a field. When the plants are too close to each other, the crop is small. When the plants are too far apart, the yield per acre is low and the crop potatoes may be larger than the ideal market size.

The precise placement of every set relative to the center of a furrow and relative to each other depends on many factors, one of which is referred to herein as "set roll". During potato planting for example, every set is released at a fair speed. It falls into the furrow and rolls until it loses all of its forward momentum. This is called "set roll" or "seed roll". A certain amount of set roll would be acceptable if all the set had the same amount of set roll and would maintain an even spacing there-between. That is not the case, however. In North America, potato growers usually cut their seed potatoes in parts which means that the sets do not have an uniform shape, size and weight, and therefore, not the same ability to roll.

There are other factors that influence the amount of set roll that occurs while planting a crop. The largest of these factors effecting set roll is the speed at which the planter is being pulled forward. The sets in the planter, carry a forward momentum as they are being released from the planter. When the sets hit the ground, they roll in the furrow until the forward momentum is lost. This phenomenon causes the sets to be irregularly spaced from each other. Such irregular spacing is considered as a negative planter performance. Ideally, the speed of the planter should be adjusted as soon as irregular spacing occurs.

As can be understood, a set roll takes place between the time the sets are released from the planter or seeder and before they are covered over by a furrow closing mechanism such as a coulter, spades, soil amending wheels, etc. Therefore, the exact location of the final resting place of the sets in the ground cannot be accurately predicted.

It is well known that when planting potato sets at speeds exceed 2.5 mph, set roll begins to greatly affect the seed spacings. Despite of this, most potato growers don't operate their planter at such slow speed during planting. Most growers want to take advantage of a sunny and dry period in mid-May usually, to plant their fields as early and as quickly as possible to maximize the number of growing days before harvest. Therefore, a majority of potato growers in Eastern Canada plant their fields at high speeds such as 4, 5 and even 6 mph when planting a Russet-Burbanks™ variety, for example. In a short growing season, a tradeoff is made between maximum growing days and maximum crop yield.

A substantial reduction of "set roll" in potato sets, has been achieved by using a press wheel mounted behind the seed drop chute, and deflectors to project every set in the forward shadow of the press wheel. The press wheel instantly presses each set against the bottom of the furrow to control the rolling motion of that set and to reduce set roll. This arrangement is illustrated herein at FIG. 1, and is described in U.S. Pat. No. 9,258,940 issued on Feb. 16, 2016, to R. Craig McCloskey, the inventor in the present application. This machine is referred to hereinafter as the McCloskey planter.

Despite all the advances in the art, the verification of a planter performance is still done by digging a section of a furrow by hand and hoe, to measure the actual set spacing. This is usually done in the evening when the planting day is over. This is time consuming and introduces a delay in any correction to be made to the planter's speed or to other settings. Using the hand and hoe method, a farmer can only hope to do better the next day.

Besides planting speeds, there are other factors influencing a planter's performance while planting. For example, the seed's physical characteristics, the topography of the field in which the planter is operating, mechanical wear, dirt buildup on planter's surfaces and weather conditions.

As for weather conditions, it is known that the speed of a planter must be reduced in the morning when the soil is relatively moist. Speed can be increased in the afternoon when the soil is somewhat dryer and warmer.

However, a slower planting speed is very expensive in many ways. Reducing speed during planting extends planting season and shortens the growing season. Losing growing days in a limited growing season could be detrimental in reaching a financial breakeven point for a farmer.

Therefore, it is believe that there is a need in this agricultural industry for a method and a system for determining planter performance in real time, such that ideal speed and performance can be continually achieved. There is a need for a method and system to eliminate trials and errors and adjustment delays, associated with the conventional verification method by hand and hoe.

For illustration purposes, the following documents described the work of others in this field.

U.S. Pat. No. 4,239,010 issued to R. D. Amburn on Dec. 16, 1980. This document describes a seed planter having a microwave seed sensor located in the travel path of the seeds, for indicating the passage of seeds along the seed release mechanism.

U.S. Pat. No. 6,626,120 issued to J. Bogner et al. On Sep. 30, 2003. The Bogner document describes a seed planter having seed metering unit and a rotary encoder providing location information for controlling seed planting and spacing and other planted plot data.

U.S. Pat. No. 6,941,225 issued to S. Upadhyaya et al., on Sep. 6, 2005. This document describes a planter using GPS and optical sensors in the seed drop tubes to generate maps of seeds planted.

U.S. Pat. No. 7,726,251 issued to J. R. Peterson et al., on Jun. 1, 2010. The planter described therein has a camera to detect the seed placement and spacing in the furrow.

U.S. Pat. No. 8,473,168 issued to D. M. Goldman et al., on Jun. 25, 2013. The Goldman document describes a seed planter data acquisition system. The planter can detect individual seed dropping from the drop tube and record the coordinates of that seed using a global positioning system.

U.S. Pat. No. 8,948,976 issued to S. L. Untuh on Feb. 3, 2015. The Untuh document describes a seed planter having a seed meter assembly on the seed plate and a distance measuring instrument to produce a map of seed population in a planted field.

US 2013/0125800 published on May 23, 2013 by D. Landphair et al. This publication also describes a planter using camera to detect seeds in the furrow. As in the Peterson document listed above, the camera detects the seeds in the furrow, whether the seeds are still in movement or not.

Although the seed planters of the prior art deserve undeniable merits, these planters neglect to consider set roll. These prior inventions detect the seeds passing in the drop chute or immediately below the drop chute. The amount of roll of each set and its final resting place in the furrow remain unknown. Therefore, these prior art devices cannot be used to provide a real-time planter performance, such that adjustments can be made on the fly.

Therefore, it is believed that a need exists in the field of seed planter for a system and method to detect in real time, the final resting place of every set in a furrow, such that a planter's speed and other adjustment can be made in real time to maximize acreage planted during each available planting day.

SUMMARY OF THE INVENTION

In the present disclosure, there is provided a seed planter having a press wheel to check set roll and sensor associated with that press wheel to detect the final resting place of every planted set or seed in a furrow. The signals from the sensors can be used by an operator to adjust the speed of planting or other adjustment on the fly to obtain an ideal planting speed and ideal set spacing.

In one aspect of the present disclosure, the press wheel has instrumentation associated therewith detecting a rolling of the wheel over a planted set. A computing device is connected to the instrumentation and to the speed monitoring device of the planter. That computing device determines spacings between planted sets.

The data obtained is real-time data and is readily available to the operator of the planter so that the speed of the planter can be adjusted on the fly to maintain an ideal set spacing.

In another aspect of the present disocure, there is provided a seed planter having a speed monitoring device, a set release mechanism and a press wheel assembly mounted thereto near the set release mechanism. The press wheel assembly comprises a press wheel rolling over planted sets released from the set release mechanism, and checking a set roll in each of these planted sets. The press wheel also comprises instrumentation associated therewith detecting a rolling thereof over a planted set. A computing device is connected to the instrumentation and to the speed monitoring device. The computing device determines a spacing between planted sets.

In another aspect of the present disclosure, the instrumentation mentioned above includes a pressure sensor to detect a change in air pressure inside the wheel due to deformation of the press wheel when the press wheel rolls over a planted set.

In yet another aspect of the present disclosure, the press wheel has a flexible and stretchable surface capable of deforming when rolling over a planted set. Electrical switches are mounted under that surface to detect any flexion of that surface. The switches are connected to the computing device which records each occurrence of the wheel rolling over a planted set.

In yet a further aspect of the present disclosure, there is provided a method for determining exact spacings of planted sets in a furrow. This method comprises the following steps:

rolling a press wheel over planted sets wherein the press wheel has planted-set-detecting instrumentation associated therewith;

using the instrumentation, detecting a passing of the press wheel over each planted set;

relating the step of detecting with a linear speed of the press wheel, and determining spacings between planted sets.

In this method, the press wheel has the double function of checking a set roll in a planted set and determining a position of that planted set. The position obtained from this method is always a last resting place of the planted set in the furrow, after the planted set has lost its forward momentum. The data obtained is believed to be more accurate than the data obtained by other known methods in the prior art.

Most preferably, the press wheel has a soft, smooth, flexible and stretchable surface capable of deforming over a planted set, detecting an imprint of the planted set in the surface thereof, without damaging the planted set.

Furthermore, another aspect of the present disclosure is a press wheel associated with a seed planter and an agricultural soil. The press wheel has an inflated tire thereon. There is a planted set in a furrow in the agricultural soil. The press wheel is guided for movement in the furrow over the planted set. The press wheel has pressure detecting instrumentation associated therewith for detecting a rolling thereof over the planted set. The press wheel further having a tire structure, a weight and an inflation of the tire, configured for generating a soft high speed contact signature with the planted set when rolling over the planted set at high speed, for preventing bruising the planted set. This soft contact signature comprising an exponential pressure increase and pressure drop on the planted set, and an elliptical pressure transition on the planted set between the pressure increase and the pressure drop.

In yet another aspect, the press wheel has a tire with a thin, soft, flexible and stretchable surface along a central circumferential region thereof and a thick and inflexible shoulders and side walls bordering the central circumferential region. The pressure in this tire is maintained between 1.5 and 3.5 psi.

In yet another aspect, the central circumferential portion of the tire being configured for contacting the planted set over an oval-like surface, and the thick and inflexible shoulders and side walls are configured for tucking each planted sets in the soil of a furrow.

In again another aspect of the present disclosure, there is provided press wheel associated with a seed planter. The press wheel has a structure configured for generating a soft contact signature with a planted set when rolling over the planted set, for preventing bruising the planted set. Such said soft contact signature comprising an increasing pressure gradient between the press wheel and the planted set and a decreasing pressure gradient between the press wheel and the planted set, and wherein a graphical representation of the increasing pressure gradient is basically a mirror image of a graphical representation of the decreasing pressure gradient. In other words, the "rolling on" of the press wheel over a planted set is as smooth as the "rolling away" from the planted set.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 20 is an enlarged, single, typical contact signature between the press wheel according to the second preferred embodiment and a planted set;

FIG. 21 is an enlarged, single, typical contact signature between an over-inflate press wheel and a planted set, as seen in detail circle 21 in FIG. 19;

FIG. 22 is a typical imprint or contact surface between the press wheel and a planted set;

DETAILED DESCRIPTION OF THE PREFERRED EMBODIMENTS

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. The drawings illustrating machine elements are not fabrication drawings, and should not be scaled.

The planter used to explained the press wheels according to the first and second preferred embodiments of the present invention is also described in term of its operation and the function of its components. The physical dimensions, material types, and manufacturing tolerances are not provided because these details do not constitute the essence of the present invention and would be considered obvious to the skilled artisan having acquired the knowledge that is actually provided in the present document.

Each drawing has been prepared to illustrate a general concept rather that an actual fabrication. Theses drawings were prepared in this format so that they can be extrapolated and easily applied to planters of seeds and sets other than potato sets.

Figure 1:
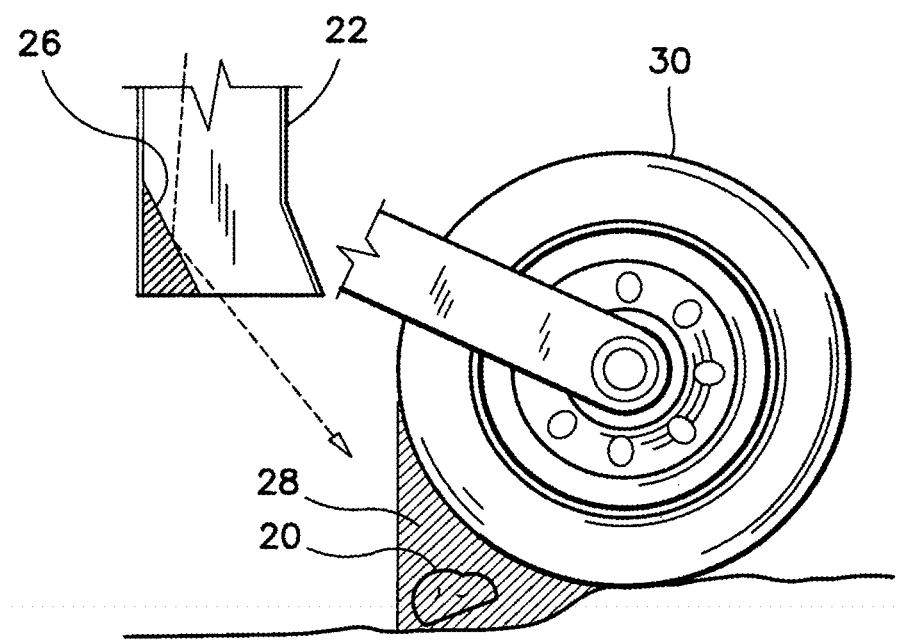
FIG. 1 is a partial side view of a potato set path and delivery under the forward half of a press wheel to reduce set roll, as built in the McCloskey planter.

Referring to FIG. 1, the press wheel of the McCloskey planter is illustrated. The McCloskey planter is considered the most important advance in the art of reducing set roll when planting sets. In the McCloskey planter, a potato set 20 is released from a planter's delivery tower 22. The seed piece or set is deflected against a deflector 26 and projected into the forward shadow 28 of a press wheel 30 rolling over the set, for checking the rolling momentum of the set against the bottom surface of the furrow. The press wheel 30 is preferably mounted on arms and spring loaded against the soil at the bottom of the furrow.

There are two preferred embodiments of press wheels used for delicate planting and data collection. The first preferred embodiment includes several variances. In the second preferred embodiment, the furrow opening shoe and the shape of the press wheel are closely associated to each other.

Figure 2:
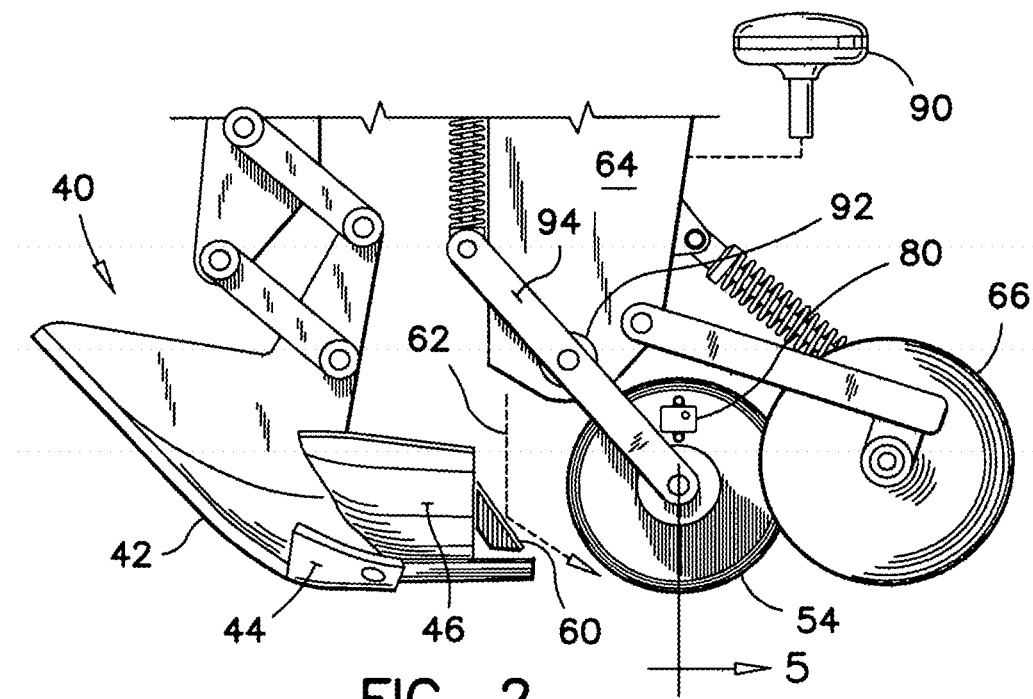
FIG. 2 is a partial side view of the preferred planter used to describe the press wheel according to a preferred embodiment, and its operation.

Referring to FIG. 2, a partial view of a planter on which the preferred press wheels are used is presented. The seed planter has a relatively wide furrow opening shoe 40. The furrow opening shoe is made of a cutting edge 42, abrasive-resistant opening plates 44 bordering the cutting edge and wings 46 for widening and lapping the bottom surface of the furrow.

Figure 3:
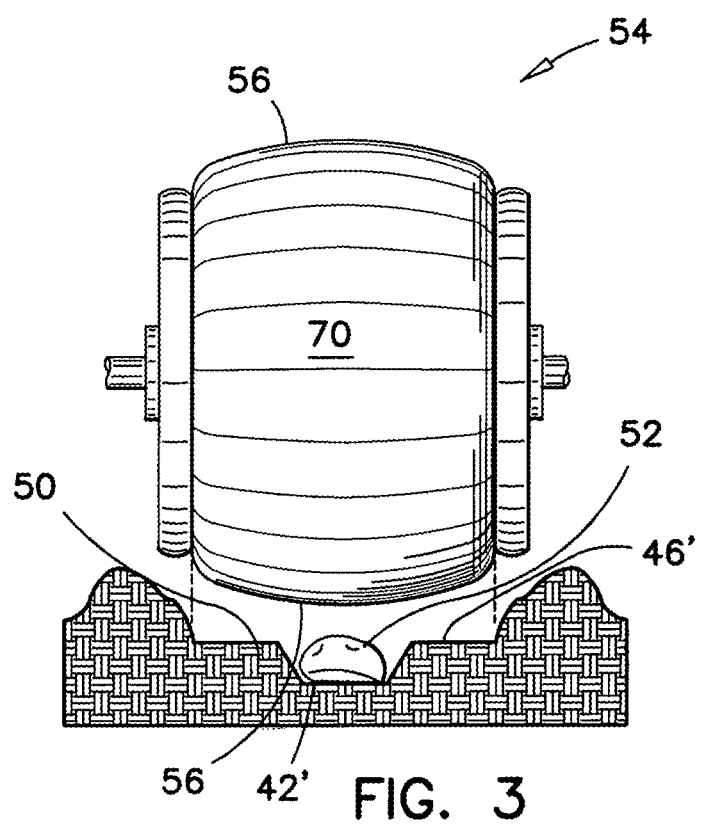
FIG. 3 is a partial cross-section view the furrow made by the preferred planter and a front view of the press wheel according to a first preferred embodiment.

The preferred shape of the furrow is illustrated by label 50 in FIG. 3. The set-receiving channel formed by the cutting edge of the opening shoe 40 is labelled as 42', and the lapped surfaces formed by the wings 46 of the opening shoe are labelled as 46'. The preferred shape of the furrow is made of the set-receiving channel 42' formed between two lapped surfaces 46'. The preferred shape 50 of the furrow has a smooth and even surface that can receive a potato seed piece or set 52. The bottom surface of a set-receiving channel 42', generally, is sufficiently hard to receive a set and supporting that set above the soil. The bottom surface of the set-receiving channel 42' is sufficiently hard so that a set in that furrow represents a detectable object when rolling a press wheel 54 over the surface of that furrow. In FIG. 3, the press wheel 54 has been lifted up the surface of the furrow for clarity. In use, the rolling surface 56 of the press wheel 54 preferably touches the surface of the lapped surfaces 46' over the entire width of these surfaces as can be understood from the illustration in FIG. 4.

Figure 4:
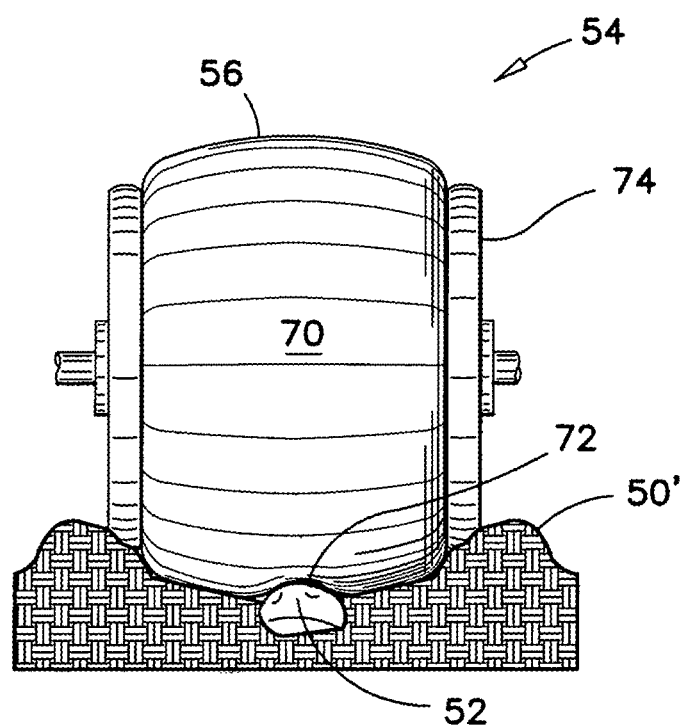
FIG. 4 is an illustration of a press wheel rolling over a potato set.

As can be understood from FIGS. 3 and 4, the width of the tire 70 on the press wheel 54 is a same dimension as the width of the furrow. As also can be understood, both sides of the press wheel 54 are supported over the lapped surfaces 46' of the furrow 50. The set-receiving channel 42' has a depth relative to the lapped surfaces 46' that is less than a general diameter of a small potato seed piece 52. When the press wheel rolls over a planted set 52, the planted set 52 protrudes above a level of the lapped surfaces 46', causes an imprint to be made in the rolling surface 56 of the wheel and represents a detectable object intersecting with the rolling surface 56 of the press wheel 54.

Referring back to FIG. 2, the planter, has deflectors 60 to deflect the trajectories 62 of sets toward a region under the forward half of a press wheel 54. These deflectors 60 are mounted to the planter between the seed delivery tower 64, and the press wheel 54. The press wheel 54 is mounted between the seed delivery tower 64 and a pair of furrow closing discs 66. It will be appreciated that the seed delivery tower 64 has of a double column configuration, delivering sets side-by-side in an alternating mode. The potato sets are released in a left-right-left mode, to improve on the efficiency of the planter. For this reason, the deflectors 60 and trajectories 62 referred to above are plural. In this drawing, both deflectors and both trajectories are superimposed over each other.

In the illustration of FIG. 2, it will be appreciated that both deflectors 60 are angled inward to project potato sets in a single row. This placement of the deflectors 60 is a standard mounting on a double column potato planter.

Press Wheel According to the First Preferred Embodiment and its Variances

The press wheel 54 according to the first preferred embodiment of the present invention has an inflated tire 70 thereon. The tire 70 is a balloon type tire and the inflation thereof is such that the surface thereof is flexible, soft and smooth. The degree of flexibility of the tire is such that the wheel 54 can roll over a set 52, flex and stretch to make an imprint 72 of the set in the surface 56 of the wheel without damaging the set. The press wheel 54 preferably has a support disc 74 on each side thereof, as can be seen in FIG. 4.

Each of the support discs 74 has a relatively large thickness and contribute to supporting part of the weight of the press wheel 54 in use. Moreover, the press wheel is supported in large part by the lapped surfaces 46'. The support discs 74 rolling in the side heaps 50' of the furrow and the rolling surface 56 of the press wheel rolling on the lapped surfaces 46' contribute to support the weight of the press wheel 54 and to prevent impacts of the press wheel against a planted set.

Figure 5:
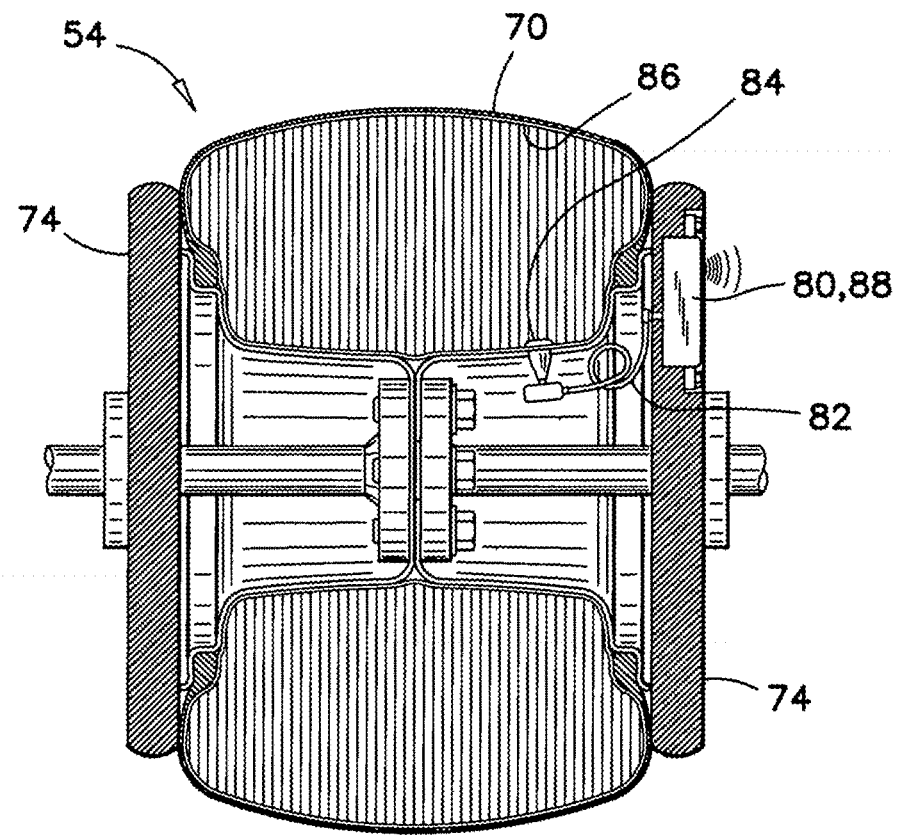
FIG. 5 is a cross section view of the press wheel in the first preferred embodiment, as seen along line 5 in FIG. 2.

Referring now to FIGS. 2 and 5, the press wheel 54 has pressure-detecting instrumentation 80 mounted therein. In the preferred embodiments, the pressure-detecting instrumentation 80 includes a connection 82 to the valve stem 84 of a tube 86 mounted inside the tire 70. It will be appreciated that a tubeless tire may also be used.

The pressure-detecting instrumentation 80 is mounted inside a sealed compartment 88. This compartment 88 is preferably mounted to, or encased in the support disc 74 of the wheel 54. The pressure-detecting instrumentation 80 monitors the internal air pressure of the tire 70 through the connection 82 to the valve stem 84. The sensitivity of the instrumentation is sufficient to detect a set making an imprint 72 on the surface 56 of the press wheel 54 when the press wheel 54 rolls over that planted set.

The pressure-detecting instrumentation 80 also include a transmitter to transmit a wireless signal to a receiver and a computer.

In use, the wireless signal is transmitted to the computer which records every occurrence of the press wheel rolling over a set. This signal is associated with the speed of the planter, by the computer, to determine a real-time spacing between the sets.

This real-time spacing of the sets can be used by an operator to regulate the speed of the planter, on the fly, to take advantage of good and dry soil condition, for example. This real-time spacing signals can also be used by an operator to reduce the speed of the planter when the spacing of planted sets starts to deviate from an ideal value. The real-time spacing can be used by an operator to operate a planter at its maximum performance at all times and under all field conditions. This set spacing data obviates the need for the conventional manual set-spacing verification method mentioned before.

The seed planter used with the press wheels according to the preferred embodiments preferably has a global positioning system (GPS) transmitter/receiver 90 mounted thereon. The signal from this GPS 90 is advantageously added to the instrumentation mentioned above to compute other valuable data.

In the planter used with the press wheels according to the preferred embodiments, an encoder 92 is mounted on the swing arm of the press wheel 54 to establish a relation between the lower surface of the press wheel 54 and the location of the GPS 90 on the machine. The information collected by the GPS system 90 is combined to the pressure signal mentioned above and to the speed of the planter to determine the X-Y-Z coordinates (longitudinal, lateral, and depth) of every seed planted.

Figure 6:
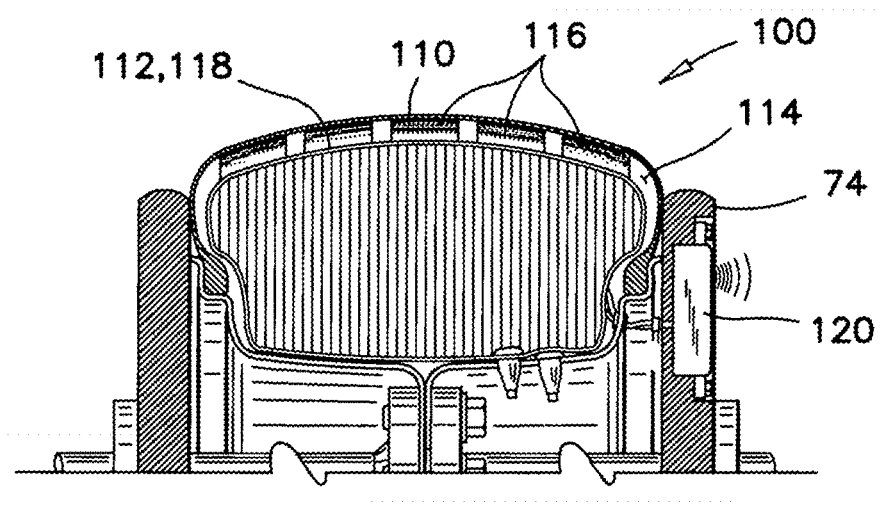
FIG. 6 is a partial cross-section view of a first alternate press wheel in the planter according to the preferred embodiment.

Referring now to FIG. 6 an alternate press wheel 100 is partly illustrated therein. This particular press wheel 100 has two inflatable chambers therein. The wheel has a tubeless tire 110 and a tube 112 mounted inside the tubeless tire 110. Both the tube 112 and the tire 110 are inflated such that a space 114 is maintained between the tube 112 and the inside surface of the tire 110. It will be appreciated that the tire 110 is also a balloon-type, flexible and stretchable tire as described before, capable of deforming over a set without bruising or damaging the set.

The inside surface of the tire 110 has several strips 116 of flexible metallic foil bonded thereto. The outside surface of the tube has a flexible metallic coating 118 thereon. The metallic coating 118 and the foil strips 116 are electrically connected to a circuit inside a signal transmitting compartment 120 mounted to the support disc 74 of the wheel 100.

When the press wheel 100 rolls over a set, the surface of the tire is deflected, causing one of the foil strips 116 to come in contact with the metallic coating 118 of the tube 112, and sending an electric signal to the signal transmitting instrumentation. This signal is recorder by a computer to record the placement of every set along and across the furrow.

Figure 7:
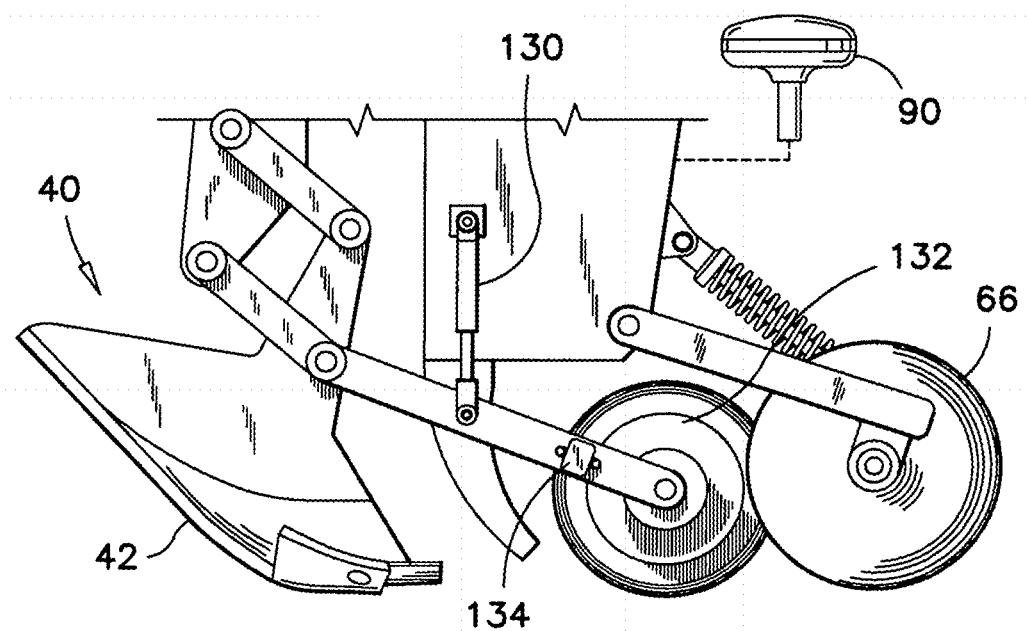
FIG. 7 is a side view of a small seed planter.

It will be appreciated that a number of other devices can also be used in association with a press wheel to determine the exact position of a seed in a furrow. As a first example, a position sensor 130 is mounted on one of the arms supporting the press wheel 132 such as illustrated in FIG. 7, to detect an upward displacement in the press wheel 132. This position sensor 130 may be a linear encoder or a pressurized cylinder in which a change in pressure can be measured.

Figure 8:
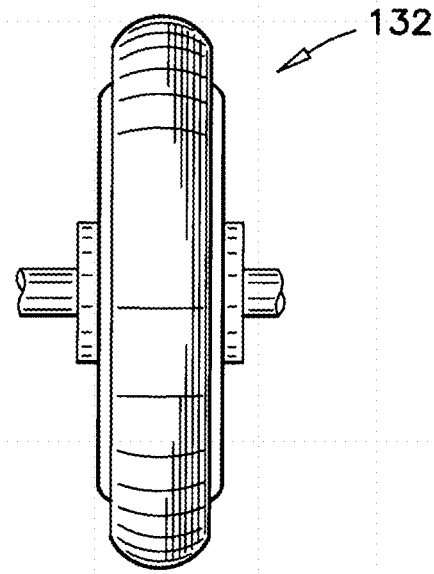
FIG. 8 is a front view of the preferred press wheel in the small seed planter.
Figure 9:
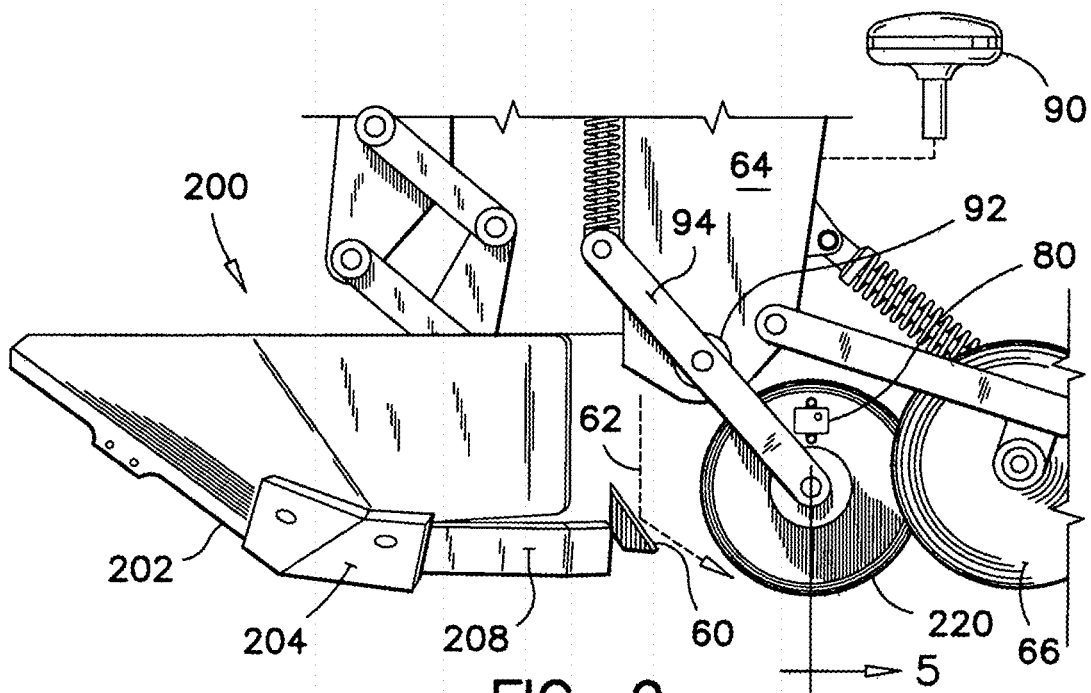
FIG. 9 illustrates a combination of a preferred furrow opening shoe and a press wheel combination, according to the second preferred embodiment.
Figure 10:
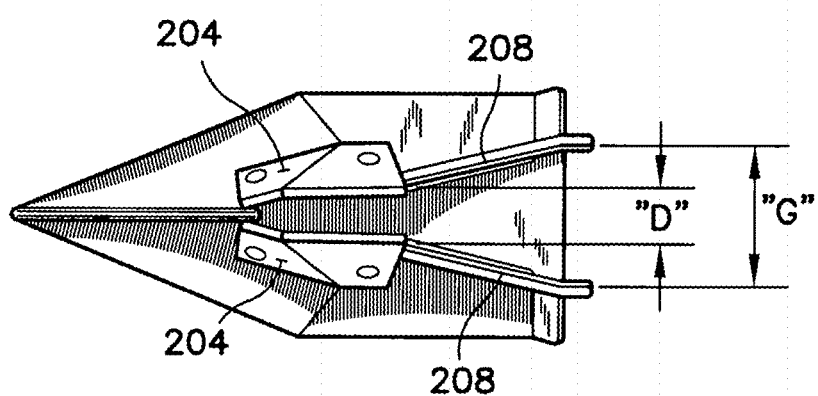
FIG. 10 is a bottom view of the preferred furrow opening shoe illustrated in FIG. 9.
Figure 11:
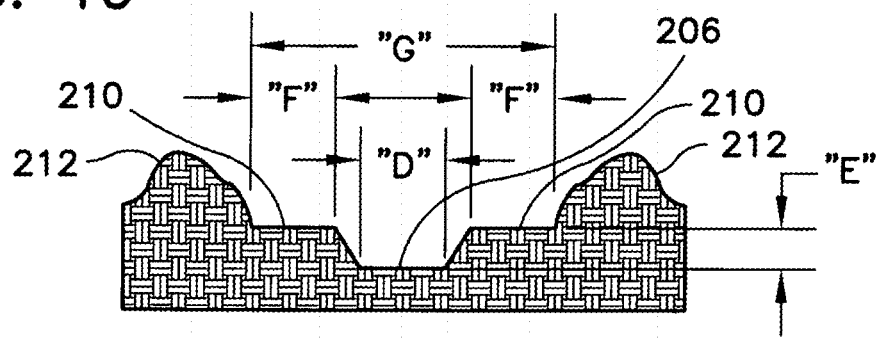
FIG. 11 is a cross-section of the preferred furrow formed by the opening shoe illustrated in FIG. 9 and FIG. 10.
Figure 12:
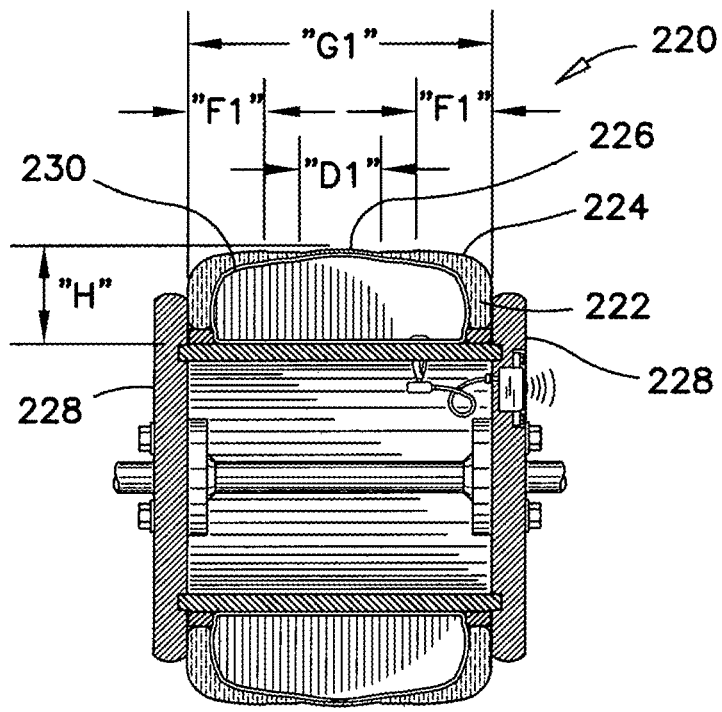
FIG. 12 is a diametrical cross-section of the press wheel according to the second preferred embodiment.

In an other alternate embodiment, the press wheel 132 as illustrated in FIG. 8 is relatively narrow wheel for use in planting small hard seeds such as corn and bean seeds. The wheel is preferably made of thin metal and hollow. A detectable pinging sound of the wheel 132 rolling over a seed is recorded and related to seed location. Alternatively, a vibration in the wheel can be detected and associated with seed location. In the example of FIG. 7, an encoder 134 is mounted to the arm supporting the press wheel 132 for associating an angular position of the wheel to every ping noise heard from the wheel, and for calculating seed spacing.

In yet other examples, proximity detectors can be used in association with the press wheel; pressure sensitive mats such as those used in gait analysis can be used in a wrapped-around mode around the press wheel or immediately under the flexible outer layer of the tire 70 to record impacts of the wheel against seed pieces. When a gait analysis mat is used, it can be used with an encoder 134 on the press wheel axle to determine an exact set placement relative to the lowermost point on the wheel.

The possibilities listed above represent only a few examples, as still other equipment can be used in association with a press wheel to detect the position of a set after a momentum of that set has been depleted.

Press Wheel According to the Second Preferred Embodiment

Referring now to FIGS. 9-23, the press wheel according to the second preferred embodiment will be described. The press wheel according to the second preferred embodiment has a profile that closely matches the profile of the furrow opening shoe 200. The furrow opening shoe 200 has a cutting edge 202, a pair of abrasive-resistant pads 204 positioned to form a seed-receiving channel 206 of a width "D" of about 2.5 inches and a depth "E" of about 1.0 to 1.5 inches. The furrow opening shoe 200 has a pair of abrasive-resistant lapping arms 208 positioned along the bottom of the shoe to form a pair of horizontal shelves 210 in the furrow, bordering the seed-receiving channel 206. Each of these horizontal shelves 210 has a width "F" of about 2.5 inches. Both shelves 210 define a furrow width of a dimension "G" of about 9 inches. Heaps of soil 212 are formed along both sides of the furrow, outside the shelves 210.

The press wheel 220 according to the second preferred embodiment has a low profile tire 222 with a width "G1" of about 7.5 inches, to loosely fit the width of the shelves 210 of the furrow. The press wheel 220 has a thickness "H" of about 3 inches. The preferred low profile tire 222 has thick, strong and inflexible shoulders 224 and side walls, and a thin, flexible and stretchable sole 226, extending around the circumference of the tire. The width "F1" of the stiff shoulders 224 of the press wheel have a respective dimension of about 2-2.5 inches. The width "D1" of the thin sole 226 is about 3 inches. The thin sole 226 is very flexible, and to a lesser degree stretchable.

The press wheel 220 also has thick circular plates 228 enclosing the low profile tire 222. The diameter of the press wheel 220 is about 12-13 inches. The tire 224 as described herein is available from Bluefield Seeding Solutions Inc., in Whiltshire, Prince Edward Island, Canada.

Figure 13:
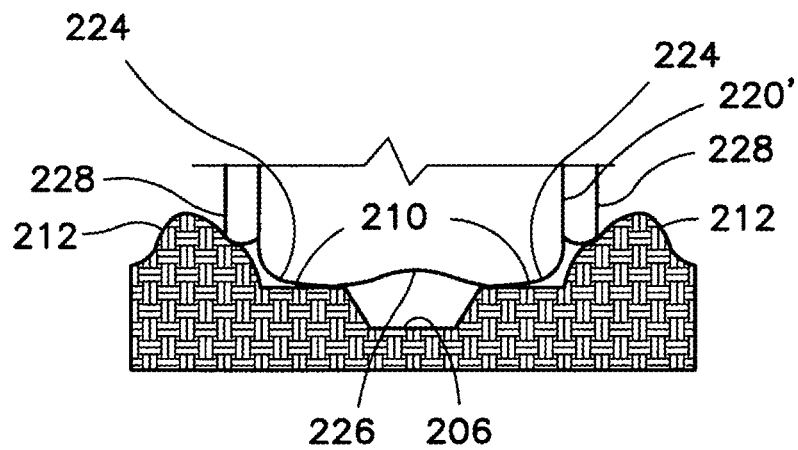
FIG. 13 is a cross-section of the preferred furrow formed by the opening shoe illustrated in FIG. 9 and FIG. 10, and a partial profile of a press wheel according to the second preferred embodiment.

Referring to FIG. 13, the profile 220' of the press wheel 220 according to the second preferred embodiment is illustrated over the profile of a furrow, as is in use. It will be appreciated from the illustration that the strong shoulders 224 of the press wheel 220 roll over the lapped shelves 210 of the furrow, and that the flexible sole 226 rolls over the seed-receiving channel 206. It will also be appreciated that the thick circular discs 228 of the press wheel roll over and into the heaps 212 of the furrow.

The supporting soil under the discs 228 and the shoulders 224 of the press wheel 220 contribute to supporting a major portion of the weight of the press wheel 220, so that the sole 226 of the wheel delicately rolls over sets in the seed-receiving channel 206. The arms 94 supporting the press wheel 220 can also be calibrated to add or subtract some of the pressure of the wheel 220 against the soil. One measure to determine if the press wheel is properly supported, is to operate the press wheel 220 without creating any wave in the soil ahead of the wheel 220.

The press wheel according to the second preferred embodiment has low profile tire 222 thereon. The tire has a tube 230 therein, a width "G" and a height "H". The thickness of the sole 226 of the tire is the thickness of a membrane to protect the tube 230. The press wheel has a total weight of about 72-74 pounds. The tube 230 is preferably inflated to a pressure between 1.5-3.5 psi. It has been found that a pressure above 3.5 psi produces set damage. A pressure below 1.5 psi makes it more difficult to detect an imprint being made in the tire. A pressure of about 2.5 psi has been found to be ideal.

The downward weight applied by the press wheel against the soil of the furrow is about 75 lbs, to help the seed pieces being absorbed by the press wheel and to cause an imprint to be made in the tire. However most of this weight is absorbed by the support discs 228 riding in the side heaps 212 of the furrow and by the shoulders 224 of the press wheel riding on the lapped shelves 210 of the furrow. The press wheel rolls firm and steady on the lapped shelves 210 of the furrow and floats gently over the seed-receiving channel 206. As mentioned before, the press wheel rolls in the furrow without creating a wave of soil in front of the wheel. These details allows the press wheel 220 to ride over planted sets at high speed without damaging the sets and without missing a detection of a set.

Figure 14:
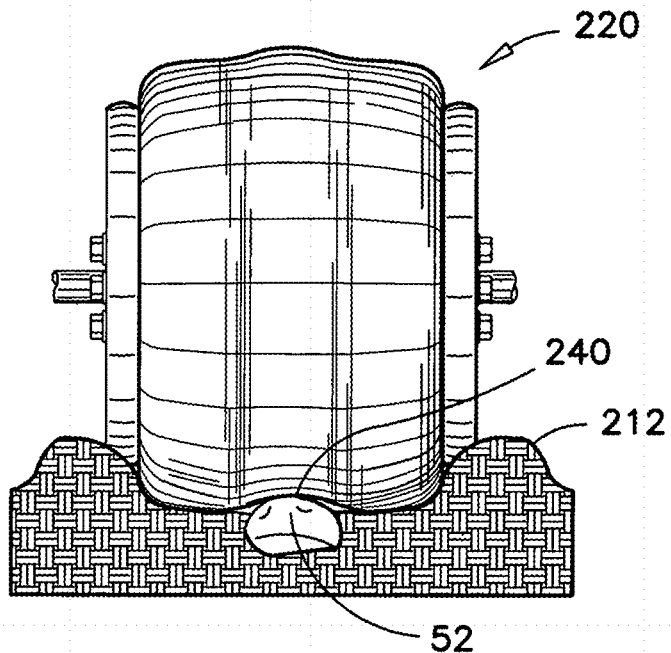
FIG. 14 is front view of the press wheel according to the second preferred embodiment checking a set roll of a planted set.
Figure 15:
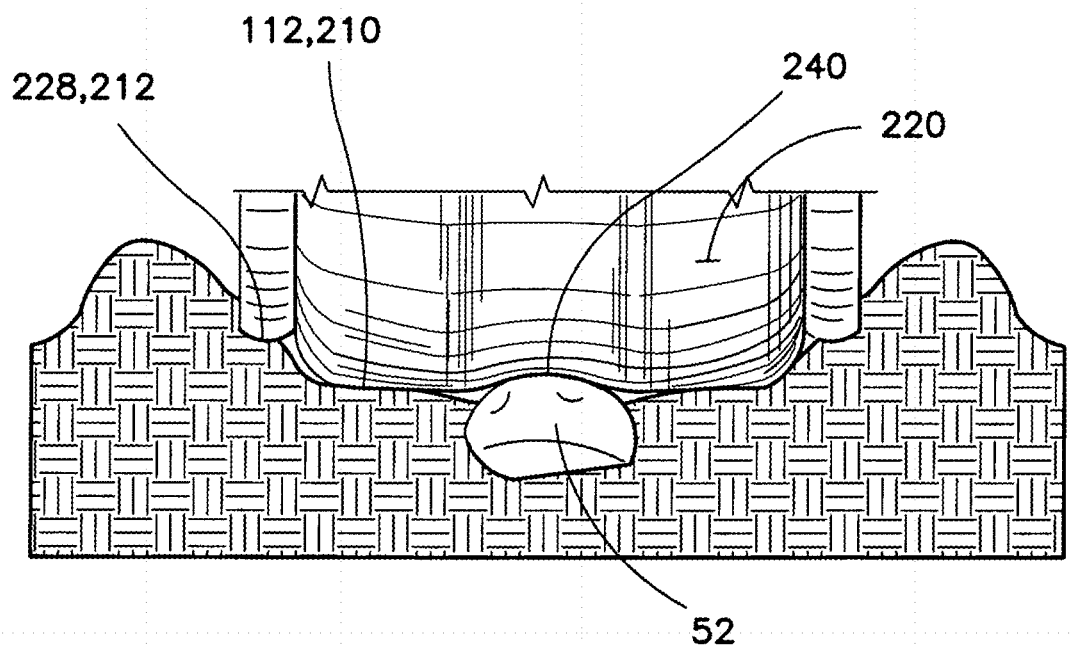
FIG. 15 is an enlarged partial view of the press wheel in FIG. 14; checking a set roll of a planted set.

Referring now to FIGS. 14-15, the operation of the press wheel 220 will be explained. In use, the weight and rolling of the press wheel 220 causes the soil of the furrow to be displaced toward the centre of the furrow. The movement of soil fills the seed-receiving channel 206 around the planted sets 52, tucking the sets 52 into the seed-receiving channel 206. It has been observed that the seed pieces 52 are tucked in to one half or more of their sizes, leaving only the crown portions thereof protruding above the bottom of the furrow. The crown portion of each set 52 is large enough to cause a detectable imprint 240 in the tire 222 of the press wheel 220.

Figure 16:
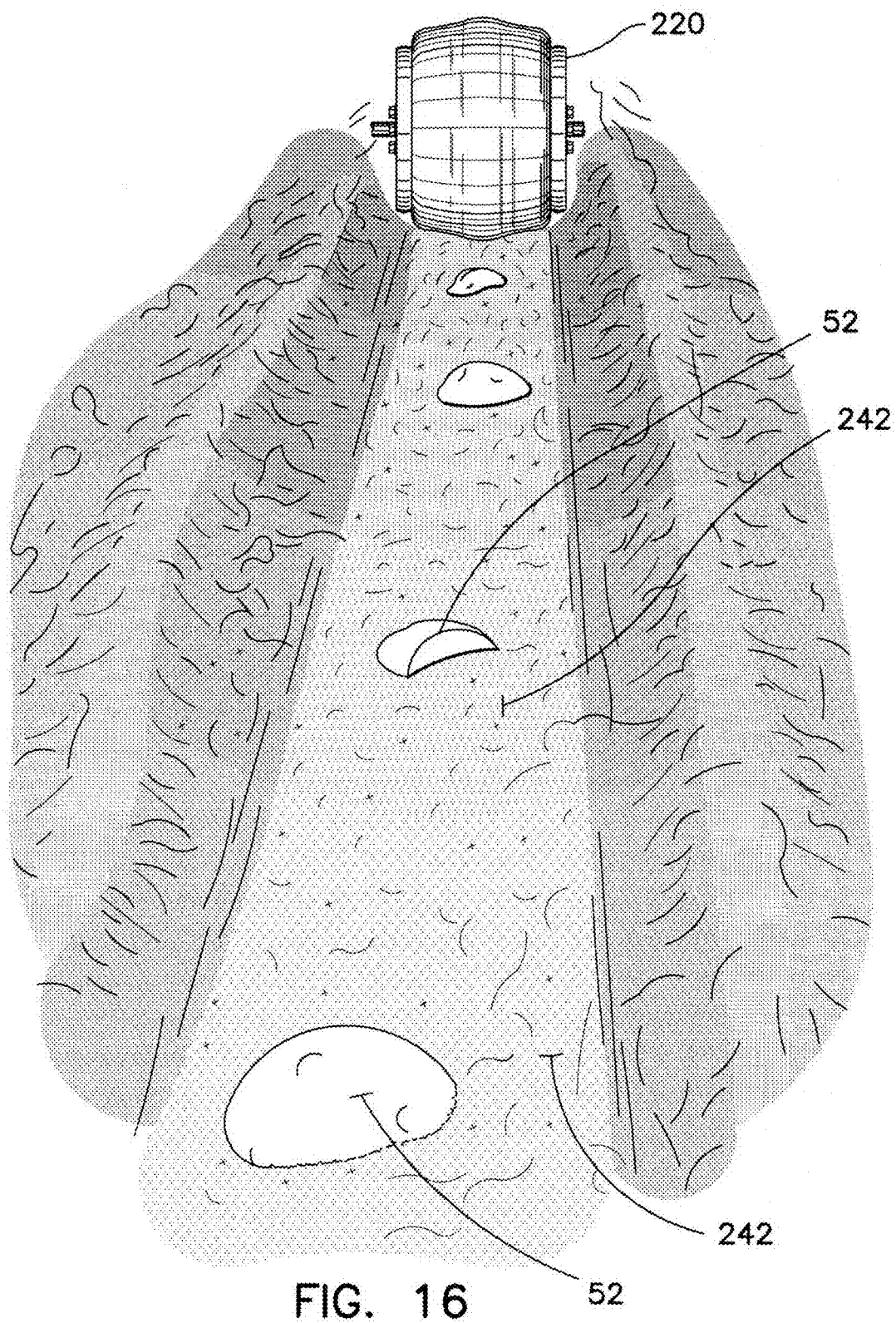
FIG. 16 is a partial perspective view of several planted sets in a furrow that has been left open, for the purpose of showing the aspect of the floor of the furrow after the sets have been planted and tucked in the soil of the furrow by the press wheel according to the second preferred embodiment.

FIG. 16 illustrates a typical bottom surface 242 of a furrow after planting, between the press wheel 220 and the closing discs 66. The distance between the press wheel 220 and the closing discs 66 being shown in a exaggerated manner, for clarity. The bottom surface 242 is relatively flat. The seed-receiving channel has been completely filled up. The seed pieces 52 have been partly buried and tucked in so that only the crown portion thereof protrude above the bottom surface 242 of the furrow.

Because of the furrow opening shoe 200 and the press wheel 220 combination described herein, the movement of the planted set 52 are delicately checked; the planted set 52 are effectively tucked in; and the crown portion of every set 52 is large enough to make an imprint 240 in the press wheel 220. Typical high speed contact signatures 244 of detected imprints 240 by the press wheel 220 according to the second preferred embodiment can be seen in FIGS. 17-18.

Figure 17:
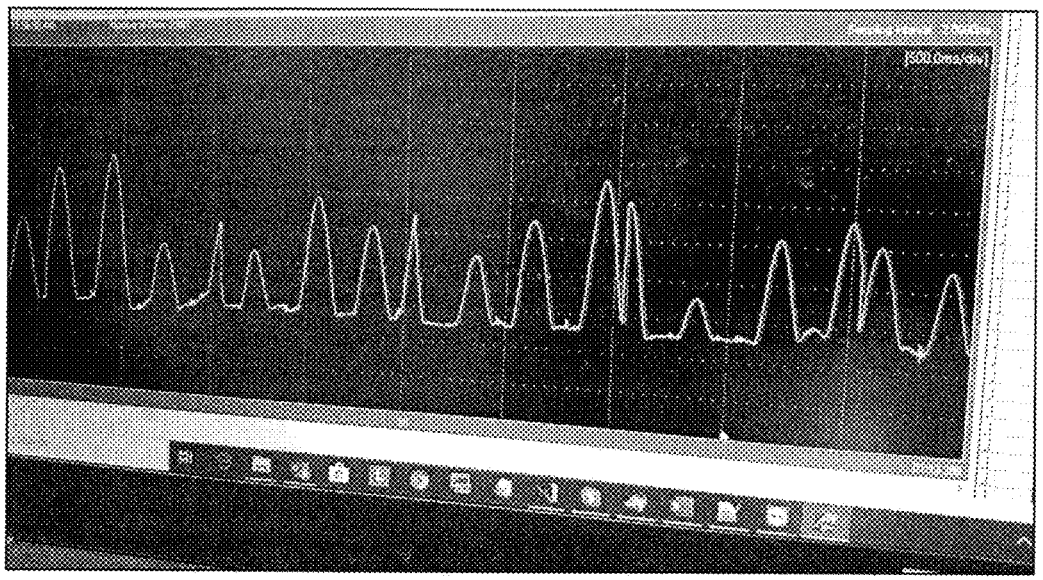
FIG. 17 is a partial view of typical "set-contact signatures" of the pressure sensor in the press wheel according to the second preferred embodiment, as seen on a computer screen associated with the planter using the preferred press wheel.

FIG. 17 illustrates true-scale press-wheel contact signatures observed during a planting run done at a set spacing of 12 inches and relatively high speed of 4 mph. The graph has been adjusted by algorithm to retain the contact signatures and ignore irrelevant noises and periods of silence.

The contact signatures 244 of detected imprints 240 have common features. Referring to FIGS. 17, 18, 20 and 23, it will be noticed that most signatures 244 have a common relatively wide base 246 or half-period, exponential pressure increase gradient 248, exponential pressure drop gradient 248', and an elliptical rise and fall portion 250 between the pressure increase and the pressure drop portions. The amplitude 252 of each signature 244 has a height that is 1 to 3 times as much as the width of the base 246 as is best illustrated in FIG. 20.

It will be appreciated that the exponential pressure increase portion 248 is representative of a delicate initial approach-contact between the press wheel 220 and the seed piece 52. The common wide bases 246 or half-periods of the signatures indicate a relatively large and consistent contact duration between the press wheel 220 and the planted set 52. The elliptical rise and fall portion 250 indicates a gentle formation of an imprint 240 without sudden impact. The shape of these signatures 244 indicates that the contacts between the press wheel 220 and the seed pieces 52 are free of shock and high pressure point. The shape of the contact signatures 244 indicates a gradual approach-contact, a smooth formation of the imprint 240, a distinguishable signal of the contact of the press wheel with the planted set and a gradual withdrawal of the press wheel away from the planted set. During an attempt to determine a shape of the imprint using common carbon paper, the pressure of the press wheel over a planted set was insufficient to mark the planted set, the surface of the press wheel or the carbon paper itself. This is mentioned herein as a measure to fully appreciate the delicateness of the contact between the press wheel and a planted set.

Figure 18:
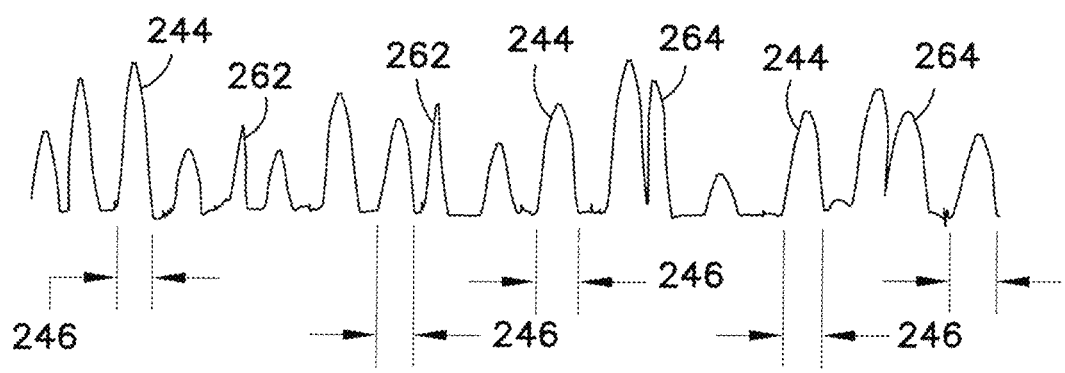
FIG. 18 is a plan view of the true-scale set-contact signatures illustrated in FIG. 17.
Figure 23:
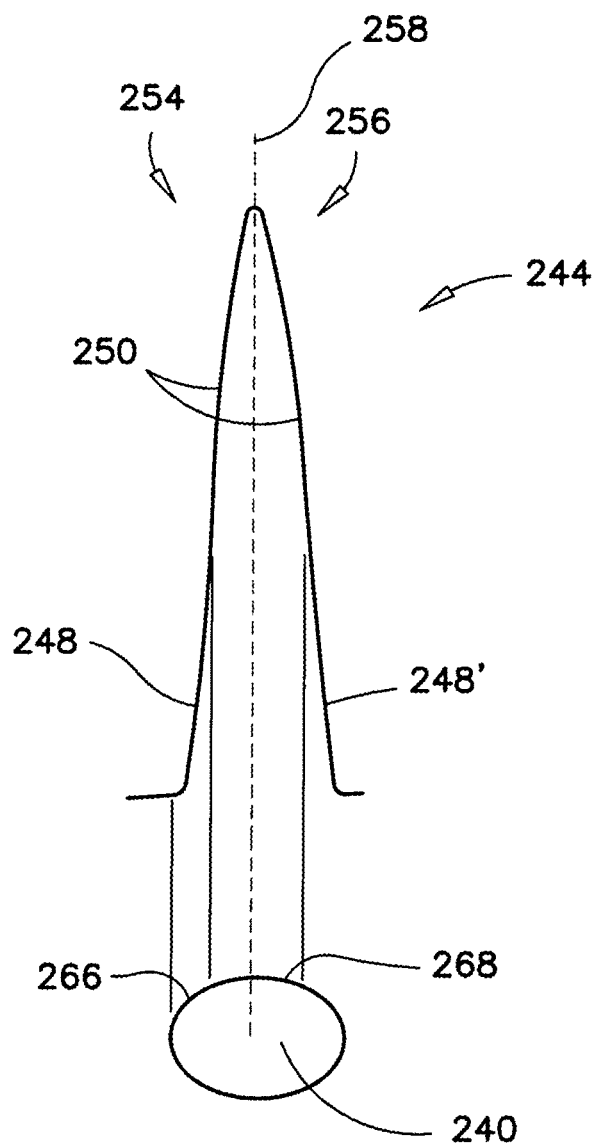
FIG. 23 illustrates the elements of a graphical representation of the typical contact signature in FIG. 20, in association with a corresponding imprint of FIG. 22.

Referring now to FIG. 23, another common characteristic in the graphical representations of the contact signatures of FIGS. 17 and 18 will be explained. The graphical representations of the contact signatures 244 obtained in FIGS. 17-18, shows that the pressure increase portion 254 of each signature 244 is basically a mirror image of the pressure decrease portion 256, relative to a median line 258 of each signature 244. This phenomenon indicates an approach-contact of the press wheel over a planted set 52 that is as smooth as the departure of the press wheel from the planted set 52.

Of course, potato seed pieces don't have a same diameter and shape. Therefore, in the planting run illustrated in FIGS. 17 and 18, the response signatures are not all the same. For example, responses 262 have a sharp pressure drop, that may have been caused by a seed piece 52 presenting only a sharp edge across the movement of the press wheel 220. In another example, double responses 264, could have been caused by a double seed drop or a seed and a clod, for example.

Referring to FIG. 23, the exponential pressure increase and decrease portion 248, 248' of the contact signature 244 is caused by a rapid increase of the size of the imprint 240 in region 266 of the imprint 240. The elliptical portion 250 of the contact signature 244 is caused by a more gradual increase and decrease of the size of the imprint 240 in the region 268.

As can be appreciated, the imprint 240 may have the shape of a circle or an oval. In this case, an oval imprint 240 fits the shape of the selected contact signature 244, because a signature for a circular imprint would have a taller exponential portion 248 and a shorter elliptical portion. Because of the curvature of the press wheel 220 in the circumferential direction, it is believed that the imprints 240 have oval shapes more often than circles. Such oval or circular contact surface or imprints 240 offers a better pressure distribution to avoid bruising the planted set. In the planting run illustrated in FIGS. 17 and 18, there is no straight-up-high-impact signature. All contact signatures 244 have consistent rise and fall over similar, relatively wide bases 246.

Figure 19:
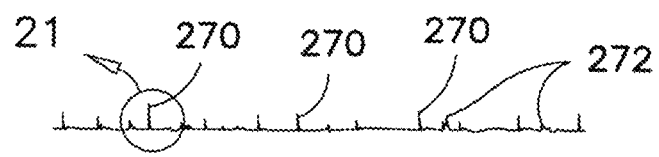
FIG. 19 is a plan view of a same-scale as in FIG. 18, of a set-contact signatures with an over-inflated press wheel.

The press wheel 220 according to the second preferred embodiment, its structure and its inflation as specified, makes it possible to obtain contact signatures of the quality illustrated, without bruising the potato seeds. This statement is enforced by showing in contrast, in FIGS. 19 and 21, a slight variation in the specified pressure and the consequences of the variation. The contact signatures as illustrated in FIGS. 19 and 21 were obtained with the press wheel 220 that was inflated to 5 psi. The signatures in FIG. 19 are illustrated at a same scale as those in FIGS. 17 and 18. However, it can be appreciated that at 5 psi, the tire has no flexion. The contact signatures 270 are made of straight up and straight down lines, indicating a sharp pressure point on the planted set. With these types of contact signatures 270, one can understand that the shock of the impact of the press wheel 220 rolling over a set is almost entirely absorbed by the planted set 52. Frequent bruising of planted sets were noticed at that pressure. Furthermore, the algorithm used in the graph of FIG. 17 has difficulties in distinguishing the planted sets when the tire pressure is that high. The contact signatures 270 are undistinguishable from machine and environment noises 272. The amplitudes of the signatures decrease as pressure increases above 3.5 psi.

Figure 24:
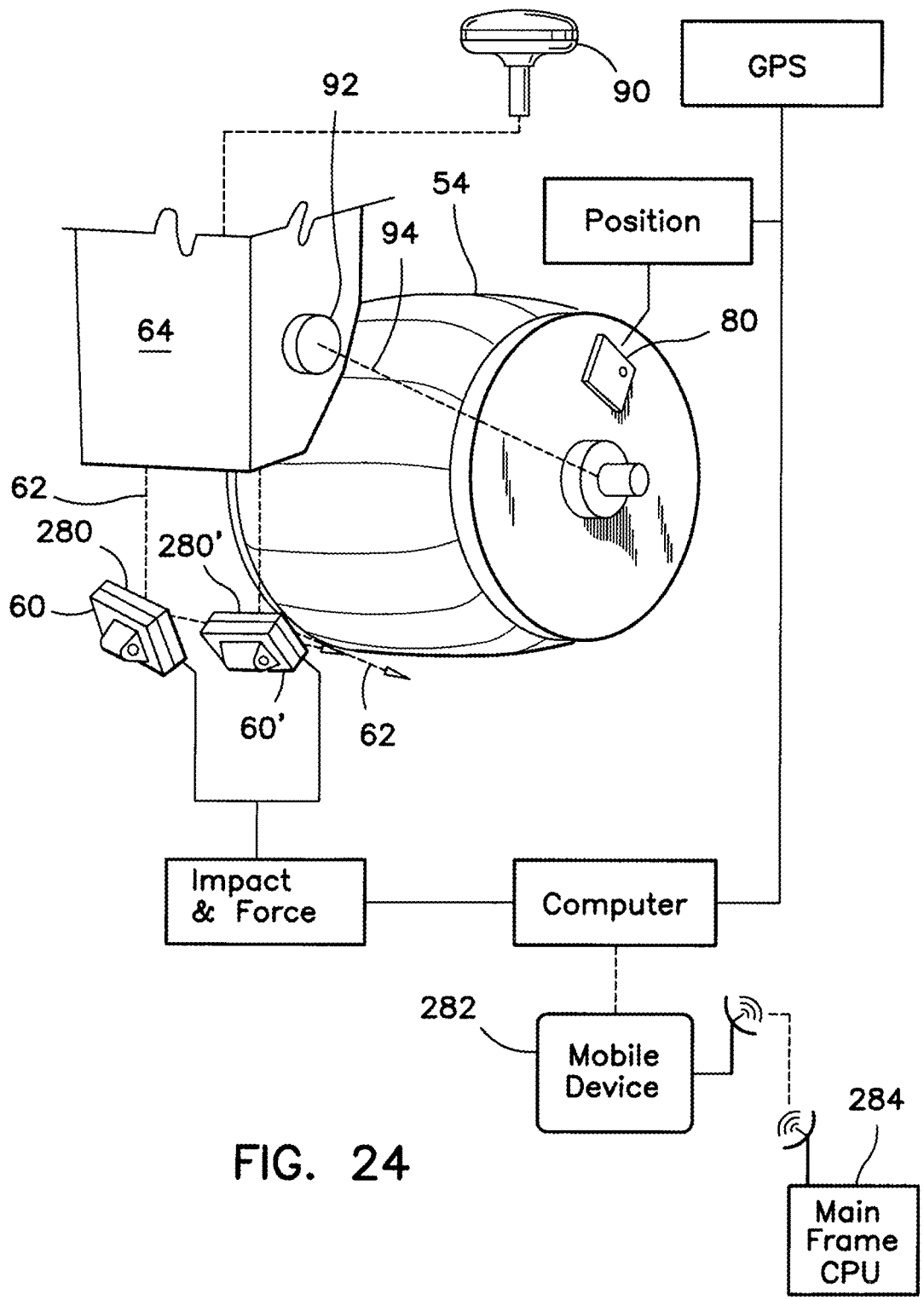
FIG. 24 is a partial perspective view of optional instrumentation associated with the press wheel according to the preferred embodiments.

Referring now to FIG. 24, there is illustrated therein a seed planter with optional additional instrumentation. This optional instrumentation includes impact sensors 280, 280' mounted on the deflecting surfaces of the deflectors 60, 60'. The impact sensors measure the force of the impact from a set bouncing off one of the deflectors. The optional instrumentation also a pressure sensor 80 as mentioned previously, and a GPS 90. The impact sensors 280, 280' are connected to a computer. The computer records the impacts of the sets against the deflectors, the impact forces of the sets, and the time of the impacts of the sets hitting each deflector 60, 60'.

The information obtained from the instrumentation mentioned herein above can be displayed on a monitor 282 to the operator of the planter in a format that indicates planter's performance. This information is also preferably transmitted to a main computer 284 in the farmer's office for example. Of course, the planter's performance data can also be displayed on a mobile communication device 284 using an app.

The following data constitute a partial list of the information available from the instrumentation described above:
- to measure real-time seed spacing;
- to measure set roll consistency;
- to detect seed misses (empty release);
- to detect double seed releases;
- to calculate total seed weight planted;
- to determine locations of the seed pieces across the width of the furrow;
- to detect efficiency of the seed delivery tower and deflectors;
- to measure performance and consistency of the planter;
- to generate maps of seed locations;
- to generate maps of planting speeds;
- to generate maps showing the topography of a field.
- to generate seed density mapping relative to field slopes, hills and low ground regions;
- to control seed discharge for aesthetical planting;
- to calculate seeds left in the hopper;
- to construct virtual paths to be used by the sprayer or the harvester;
- to detect the level of soil compaction or soil density in seed beds where the sets are located;
- to control the release of seeds or sets, into specific locations, to achieve optimal growth.

Figure 25:
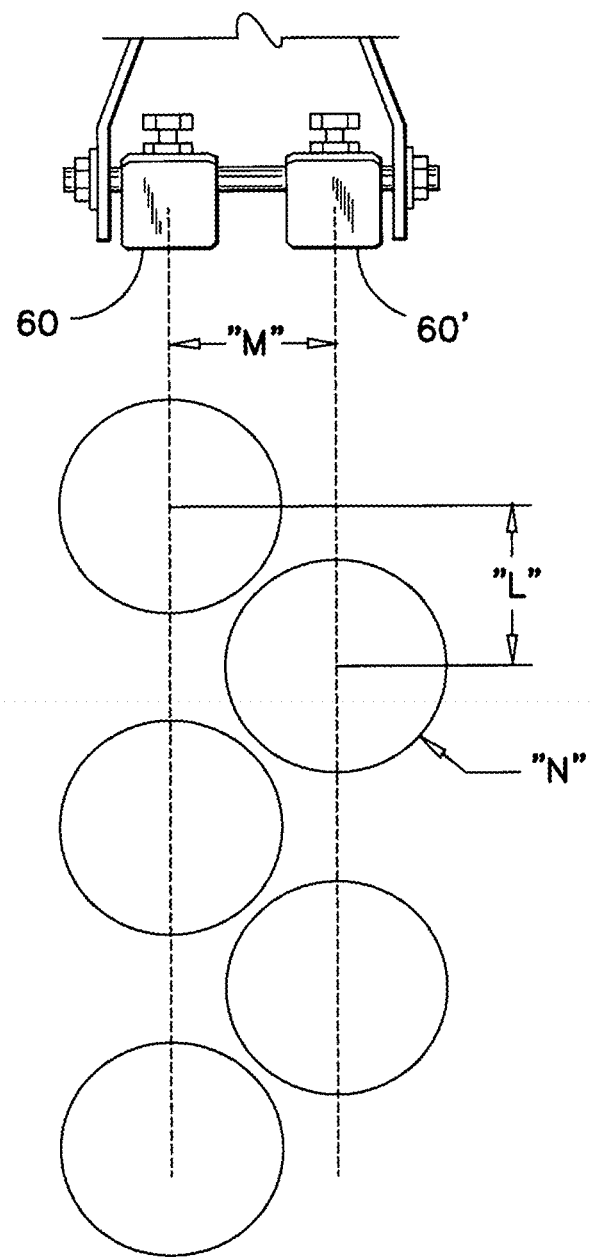
FIG. 25 is a partial plan view of a double row furrow that can be advantageously planted using the planter according to the preferred embodiment.

One possible application for the optional instrumentation described above is illustrated in FIG. 25. In this drawing, there is illustrated a plan view of a double row, or staggered planting method. In this application, both deflectors 60, 60' are oriented to deflect seeds in two spaced apart parallel rows. The longitudinal distance "L" as well as the lateral distance "M" between plants can be monitored to ensure that each plant has a minimum growth area "N" for minimizing tuber crowding.

Modern seed planters can make a relatively large furrow with a smooth surfaced bottom. Although double row or staggered planting is not well known in the industry, it is believed that this method of planting has many advantages over the single row method. The planting potato seed pieces for example, in a staggered arrangement along a single row is made to respect an ideal foot print for each plant, while reducing the longitudinal spacing between adjacent plants. In some cases, the longitudinal spacing of planted sets along a furrow can be reduced by 30%, while maintaining the same foot print for each plant. The soil usage in a potato field is thereby improved. Yield per acre is also increased.

It is believed that staggered planting will be more appreciated in the future, with the advance of precision agriculture and the use of press wheels on seed planters.

Another benefit from the data obtained from this optional instrumentation include the matching of data collected from the planter with aerial images monitoring actual plant growth. Aerial images of a potato field during the plant growing season can be compared to maps of seed weight, seed piece spacings, seed placement accuracy, or maps of planting speeds, to associate plant growth to the best planting conditions. The information derived from this matching of maps can be used to formulate corrective actions for future planting. It is also believed that the data collected from the instrumentation mentioned herein will become more and more valuable as precision agriculture continues to progress.

What is claimed is:

1. A seed planter for simultaneously planting a planted set in a furrow, checking a set roll in said planted set and detecting a location of said planted set in said furrow without bruising said planted set, comprising;

a furrow-opening shoe connected thereto and having a cutting edge for opening said furrow in a soil, and a pair of pads associated with said cutting edge to form a seed-receiving channel along a centre of said furrow;

said furrow-opening shoe also having lapping arms extending from sides thereof; said lapping arms being configured to form two horizontal shelves of soil in said furrow, with each of said horizontal shelves bordering a respective side of said seed-receiving channel, and to form two heaps of soil with each heap bordering a respective side of one of said horizontal shelves, along an outside portion of said horizontal shelve relative to said seed-receiving channel; each of said horizontal shelves being horizontally higher than a bottom surface of said seed-receiving channel so that only a portion of said planted set protrude above said horizontal shelves, and each of said heaps of soil being horizontally higher than said horizontal shelves;

a pair of arms extending thereunder supporting a press wheel and guiding said press wheel in said furrow; said pair of arms being adjustable to add or subtract pressure of said press wheel against said soil in said furrow;

said press wheel being made of a balloon-type low-profile tire having a rolling surface along a circumferential region thereof; said rolling surface comprising a central sole portion extending there-around and two circular shoulders bordering said central sole portion, with one of said circular shoulders bordering a respective side of said central sole portion; said tire being inflated at a low pressure, and said central sole portion being smooth and flexible;

said press wheel also having two circular discs mounted thereto and respectively bordering one of said circular shoulders; a diameter of said circular discs being smaller than a diameter of said circular shoulders; each of said discs having a thickness and corresponding non-neglectable rolling surfaces;

said press wheel, said arms supporting said press wheel, said diameters and said thickness being configured, for guiding said central sole portion of said press wheel for rolling over said seed-receiving channel; for guiding said circular shoulders of said press wheel for rolling over said lapped shelves, and for guiding said circular discs for rolling over and into said heaps of soil, wherein, said arms, said shoulders rolling over said lapped shelves and said discs rolling over and into said heaps of spoil; being configured for jointly supporting said press wheel to said planter and to said furrow, for delicately checking a set roll in said planted set, for avoiding creating a wave in a soil in said furrow ahead of said press wheel when said press wheel is rolling in said furrow, whereby a set roll in said planted set can be checked, and a location of said planted set can be determined in a delicate manner without bruising said planted set.

* * * * *